US011070435B2

(12) United States Patent
Ben Ari et al.

(10) Patent No.: US 11,070,435 B2
(45) Date of Patent: Jul. 20, 2021

(54) SERVICE MODEL RE-COMPUTATION BASED ON CONFIGURATION ITEM CHANGE TYPE

(71) Applicant: ServiceNow, Inc., Santa Clara, CA (US)

(72) Inventors: Tal Ben Ari, Ness Ziyyona (IL); Shlomo Sividia, Ganei Tikva (IL); Rotem Steuer, Modin (IL); Alon Mansour, Ramat Gan (IL)

(73) Assignee: ServiceNow, Inc., Santa Clara, CA (US)

( * ) Notice: Subject to any disclaimer, the term of this patent is extended or adjusted under 35 U.S.C. 154(b) by 144 days.

(21) Appl. No.: 16/249,765

(22) Filed: Jan. 16, 2019

(65) Prior Publication Data
US 2020/0228408 A1   Jul. 16, 2020

(51) Int. Cl.
*G06F 15/173* (2006.01)
*H04L 12/24* (2006.01)
*G06F 16/245* (2019.01)
*G06F 16/23* (2019.01)

(52) U.S. Cl.
CPC .......... *H04L 41/12* (2013.01); *G06F 16/2358* (2019.01); *G06F 16/245* (2019.01); *H04L 41/0813* (2013.01)

(58) Field of Classification Search
CPC .............................. H04L 41/12; H04L 41/0813
USPC ......................................................... 709/223
See application file for complete search history.

(56) References Cited

U.S. PATENT DOCUMENTS

| | | |
|---|---|---|
| 5,978,594 A | 11/1999 | Bonnell |
| 6,321,189 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |

(Continued)

OTHER PUBLICATIONS

International Search Report and Written Opinion for PCT Application No. PCT/US2020/013829 dated Apr. 21, 2020; 14 pgs.

(Continued)

*Primary Examiner* — Hee Soo Kim
(74) *Attorney, Agent, or Firm* — Fletcher Yoder PC

(57) ABSTRACT

A computational instance of a remote network management platform includes a database that contains a plurality of CI records corresponding to a set of computing devices, a set of software applications, and a network-based service. The database also contains a definition of a service model that represents the set of computing devices, the set of software applications, and relationships therebetween that facilitate providing the network-based service. The computational instance also includes one or more server devices configured: to receive an indication of a change to a CI record of the plurality of CI record; add, to a change record table, a change record corresponding to the change to the CI record; select, for the service layer based on a change type specified in the change record, a service model re-computation mode; and re-compute a service layer in accordance with the service model re-computation mode.

20 Claims, 12 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,734,739 B2 | 6/2010 | Natarajan et al. |
| 7,769,718 B2 | 8/2010 | Murley |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Solin |
| 8,402,127 B2 | 3/2013 | Kowalski |
| 8,457,928 B2 | 6/2013 | Dang |
| 8,478,569 B2 | 7/2013 | Scarpelli |
| 8,489,547 B2 | 7/2013 | Ayachitula et al. |
| 8,554,750 B2 | 10/2013 | Ragaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,799,399 B2 | 8/2014 | Agrawal et al. |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 8,966,017 B2 | 2/2015 | Wipfel et al. |
| 9,015,188 B2 | 4/2015 | Behne |
| 9,026,996 B2 | 5/2015 | Ramachandran |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,420,064 B2* | 8/2016 | Mohaban ............. G06F 16/148 |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 2008/0025223 A1* | 1/2008 | Karacali-Akyamac ..................... H04L 41/12 370/241 |
| 2011/0148880 A1* | 6/2011 | De Peuter ............... H04L 41/12 345/440 |
| 2012/0323814 A1* | 12/2012 | Klein .................... G06Q 10/06 705/348 |
| 2014/0019611 A1* | 1/2014 | Weavind ............. H04L 41/0853 709/224 |
| 2015/0007187 A1 | 1/2015 | Shows |
| 2015/0280981 A1* | 10/2015 | Sasada ............... H04L 41/0853 709/222 |
| 2016/0142262 A1* | 5/2016 | Werner .................. H04L 41/22 709/224 |
| 2016/0182299 A1* | 6/2016 | Polinati .............. H04L 41/5058 709/220 |
| 2017/0126472 A1* | 5/2017 | Margalit ................ H04L 43/08 |
| 2017/0134240 A1* | 5/2017 | Hevizi ................. H04L 41/069 |

OTHER PUBLICATIONS

Extended European Search Report for European Application No. 18188042.8 dated Dec. 12, 2018; 9 pgs.

U.S. Appl. No. 15/890,107, filed Feb. 6, 2018.

ServicewNow Documentation—Models, downloaded from https://docs.servicenow.com/bundle/london-it-service-management/page/product/product-catalog/concept/c_Models.html, Jul. 26, 2018.

ServiceNow Documentation—Istanbul Patch 5, downloaded from https://docs.servicenow.com/bundle/istanbul-release-notes/page/release-notes/r_istanbul-Patch-5.html, Apr. 20, 2017.

* cited by examiner

| CHANGE TYPE | SERVICE LAYER | SERVICE ENVIRONMENT | CI ID | STATUS |
|---|---|---|---|---|
| TOPOLOGY CHANGE | 2 | 2 | ab1c3 | IN_PROCESS |
| CI CHANGE | 1 | 1 | 00def3 | WAITING |
| IMPACT RULE CHANGE | 3 | 1 | 0fe3f | PROCESSED |
| SPECIAL CI CHANGE | 1 | 2 | fb5d2a | WAITING |

SERVICE MODEL RE-COMPUTATION BASED ON CONFIGURATION ITEM CHANGE TYPE

BACKGROUND

Remote management of networks may involve a remote network management platform gathering information regarding the configuration and operational aspects of a managed network. Traditionally, computing devices and applications operating on a managed network were viewed in isolation. Thus, it was difficult to determine the impact that a problem with a particular computing device or application would have on higher-layer services provided by the managed network.

Service mapping is a set of operations through which the remote network management platform can discover and organize these computing devices and applications, and represent the relationships therebetween. Service mapping facilitates the representation of the hardware and software components that jointly provide a service in a managed network. A remote network management platform can maintain a service model that represents the computing devices of a managed network, applications of the managed network, and relationships therebetween. From time to time, this service model may be updated as the hardware and software components contributing to the service change, or in order to correct part of the service model.

For some managed networks, the process of updating a service model can consume significant processing resources, thereby negatively affecting the performance of the remote network management platform. Improvements are therefore desired.

SUMMARY

The service model for a managed network can represent any devices on the managed network, any applications or services executing thereon, as well as relationships between devices, applications, and services. Each of the devices, applications, and/or services can be referred to as configuration items (CIs). Further, each CI can be represented by a corresponding CI record in a configuration management database (CMDB).

One way to maintain a service model for such a managed network is to re-compute the services of the managed network using a re-computation process as CI records of the CMDB change. The re-computation process can synchronize the CMDB with the service model by persisting changes in the CMDB into the service model. For a change affecting a given CI, the re-computation process can involve updating the information for the given CI in the service model, and also re-building the topology of the service model based on relations between the given CI and other CIs of the CMDB. Re-building the topology can involve identifying an entry point of a service to which the given CI relates, tracing the entry point to the given CI based on a set of relations between the given CI and the entry point, and resolving the set of relations into a graph.

Unfortunately, however, this re-computation process can be wasteful in terms of consumption of memory and processing resources. For instance, for a CI change that does not affect a topology of the service model, re-building the topology of the service model may be unnecessary.

The embodiments herein address this and potentially other problems by varying the manner in which a service model is re-computed depending on a type of change that is made to a CI record. When a change is made to a CI record of a CMDB, a server device can add a change record corresponding to the change to a change record table. The change record can specify a change type that is indicative of whether the change affects a topology of service model. The server device can use the change type specified in the change record as a basis for selecting a service model re-computation mode from among a plurality of service model re-computation modes, and re-compute a service layer of the service model in accordance with the selected service model re-computation mode.

Accordingly, a first example embodiment may involve a computational instance of a remote network management platform. The computational instance may include a database that contains a plurality of CI records corresponding to a set of computing devices disposed within a managed network, a set of software applications configured to execute on the set of computing devices, and a network-based service that is provided by execution of the set of software applications. The managed network may be associated with the computational instance. Further, the database may contain a definition of a service model that represents the set of computing devices, the set of software applications, and relationships therebetween that facilitate providing the network-based service. The service model may include a service environment having multiple service layers that are hierarchically-arranged within the service environment. The computational instance may also include one or more server devices configured to receive, from the managed network, an indication of a change to a CI record of the plurality of CI records. The one or more server devices may also be configured to store, in the database, the CI record as changed and add, to a change record table stored within the database, a change record corresponding to the change to the CI record. The change record may reference the CI record and a service layer of the multiple service layers, and may specify a change type that is indicative of whether the change affects a topology of the service model. The one or more server devices may also be configured to select, for the service layer based on the change type, a service model re-computation mode from among a plurality of service model re-computation modes. And the one or more server devices may be configured to re-compute the service layer of the service environment in accordance with the service model re-computation mode.

In a second example embodiment, a method may involve maintaining, by one or more server devices of a computational instance, a database that contains a plurality of CI records corresponding to a set of computing devices within a managed network, a set of software applications configured to execute on the set of computing devices, and a network-based service that is provided by execution of the set of software applications. The managed network may be associated with the computational instance. Further, the database may contain a definition of a service model that represents the set of computing devices, the set of software applications, and relationships therebetween that facilitate providing the network-based service. The service model may include a service environment having multiple service layers that are hierarchically-arranged. The method may also involve receiving, by the one or more server devices, from the managed network, an indication of a change to a CI record of the plurality of CI records. In addition, the method may involve storing, in the database, the CI record as changed and adding, by the one or more server devices, to a change record table stored within the database, a change record corresponding to the change to the CI record. The change record may reference the CI record and a service layer of the multiple service layers, and may specify a change type that is indicative of whether the change affects a topology of the service model. Further, the method may involve selecting, by the one or more server devices based on the change type, for the service layer, a service model re-computation mode from among a plurality of service model re-computation modes. And the method may involve re-computing, by the one or more server devices, the service layer of the service environment in accordance with the service model re-computation mode.

In a third example embodiment, an article of manufacture may include a non-transitory computer-readable medium, having stored thereon program instructions that, upon execution by one or more server devices of a computational instance of a remote network management platform, cause the one or more server devices to perform operations in accordance with the second example embodiment.

In a fourth example embodiment, a computing system may include at least one processor, as well as memory and program instructions. The program instructions may be stored in the memory, and upon execution by the at least one processor, cause the computing system to perform operations in accordance with the second example embodiment.

In a fifth example embodiment, a system may include various means for carrying out each of the operations of the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts a change record table, in accordance with example embodiments.

DETAILED DESCRIPTION

Figure 1:
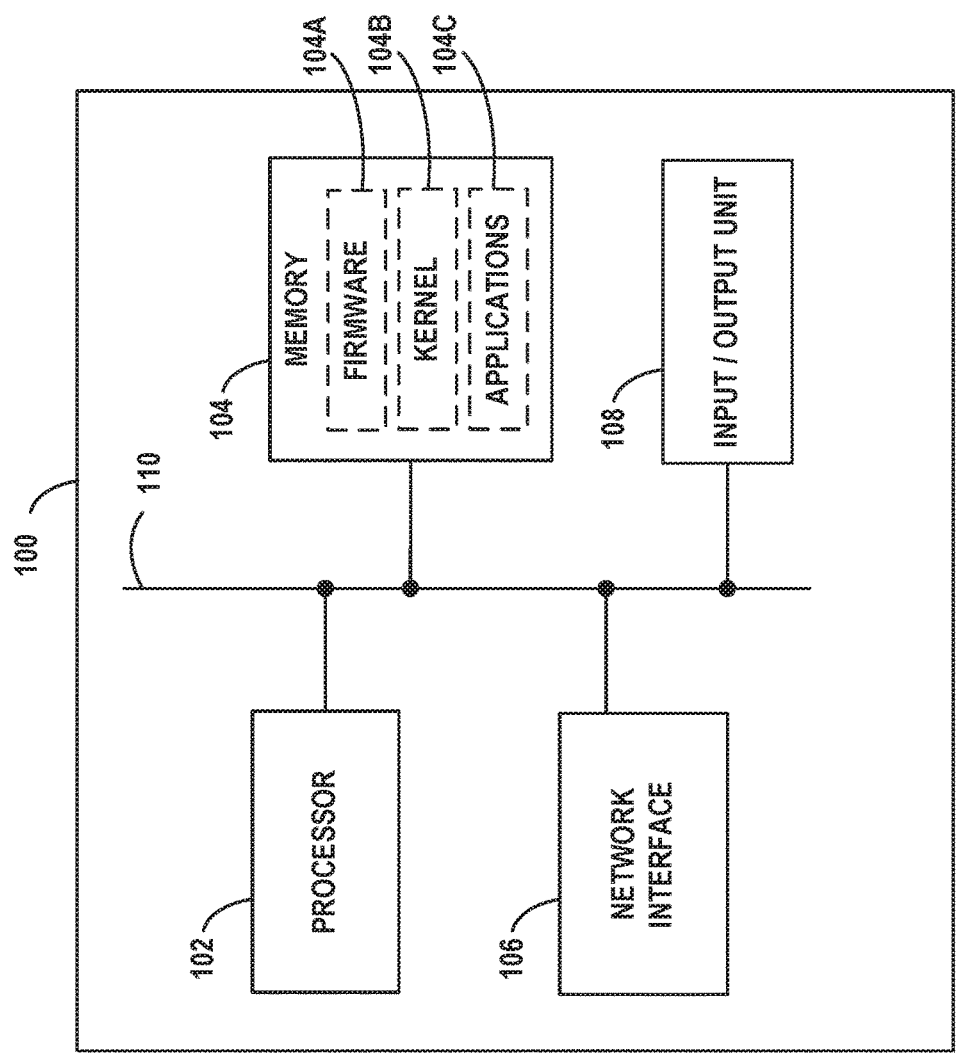
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
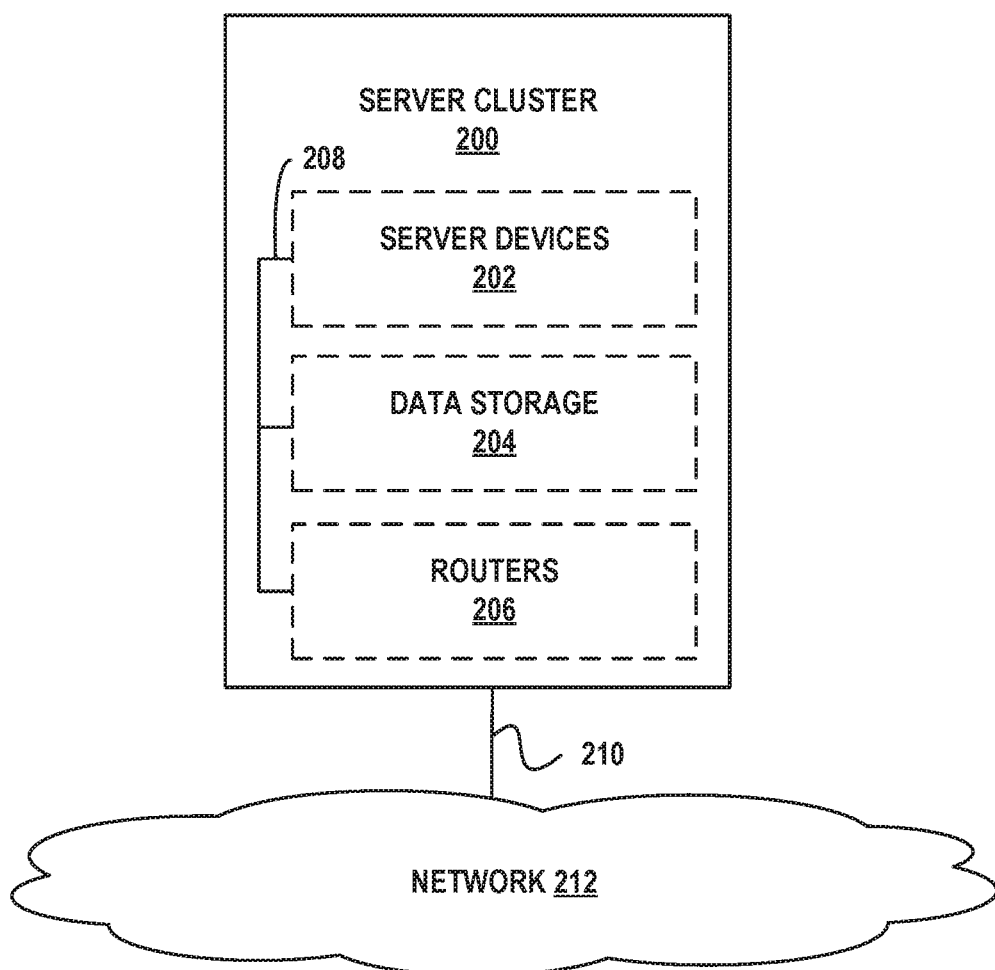
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
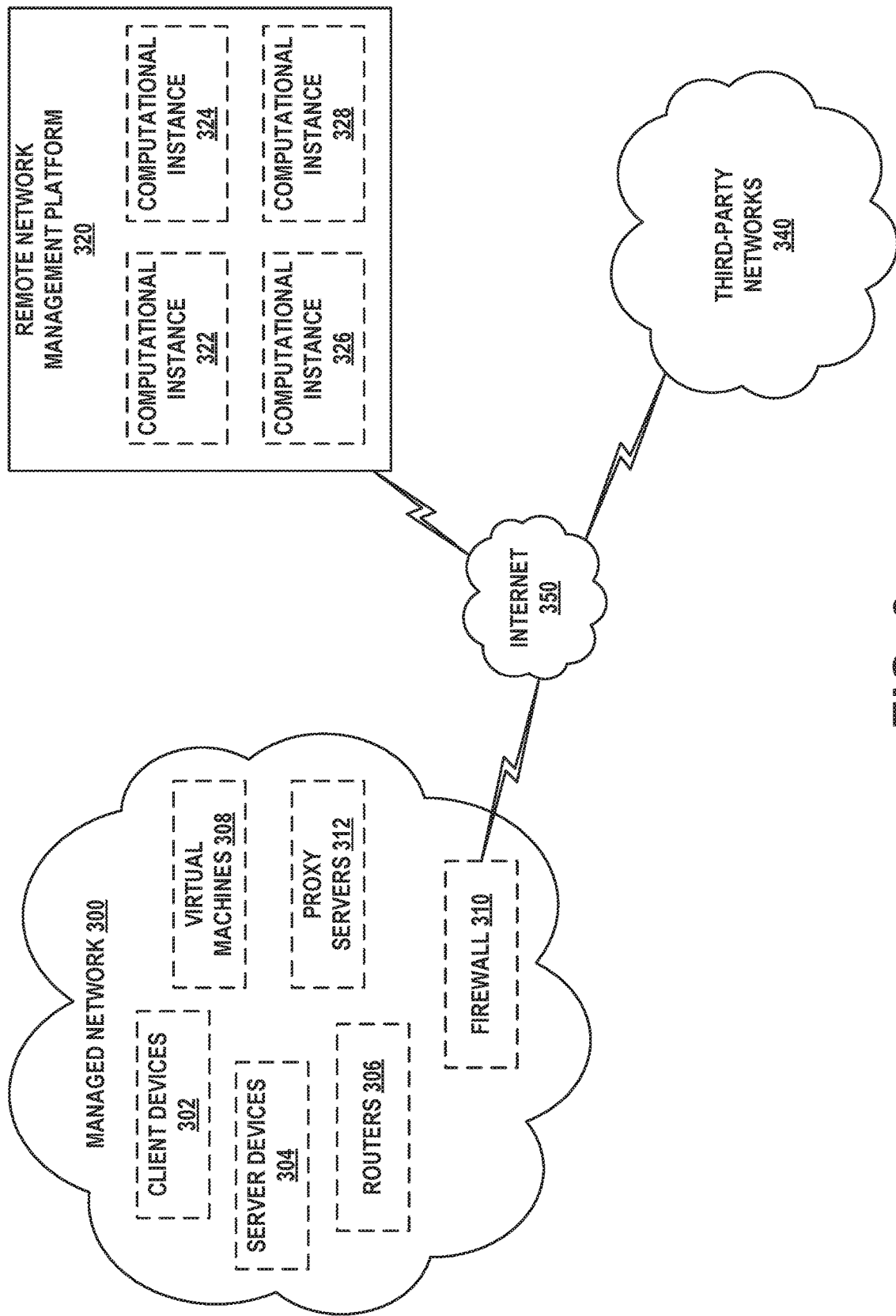
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
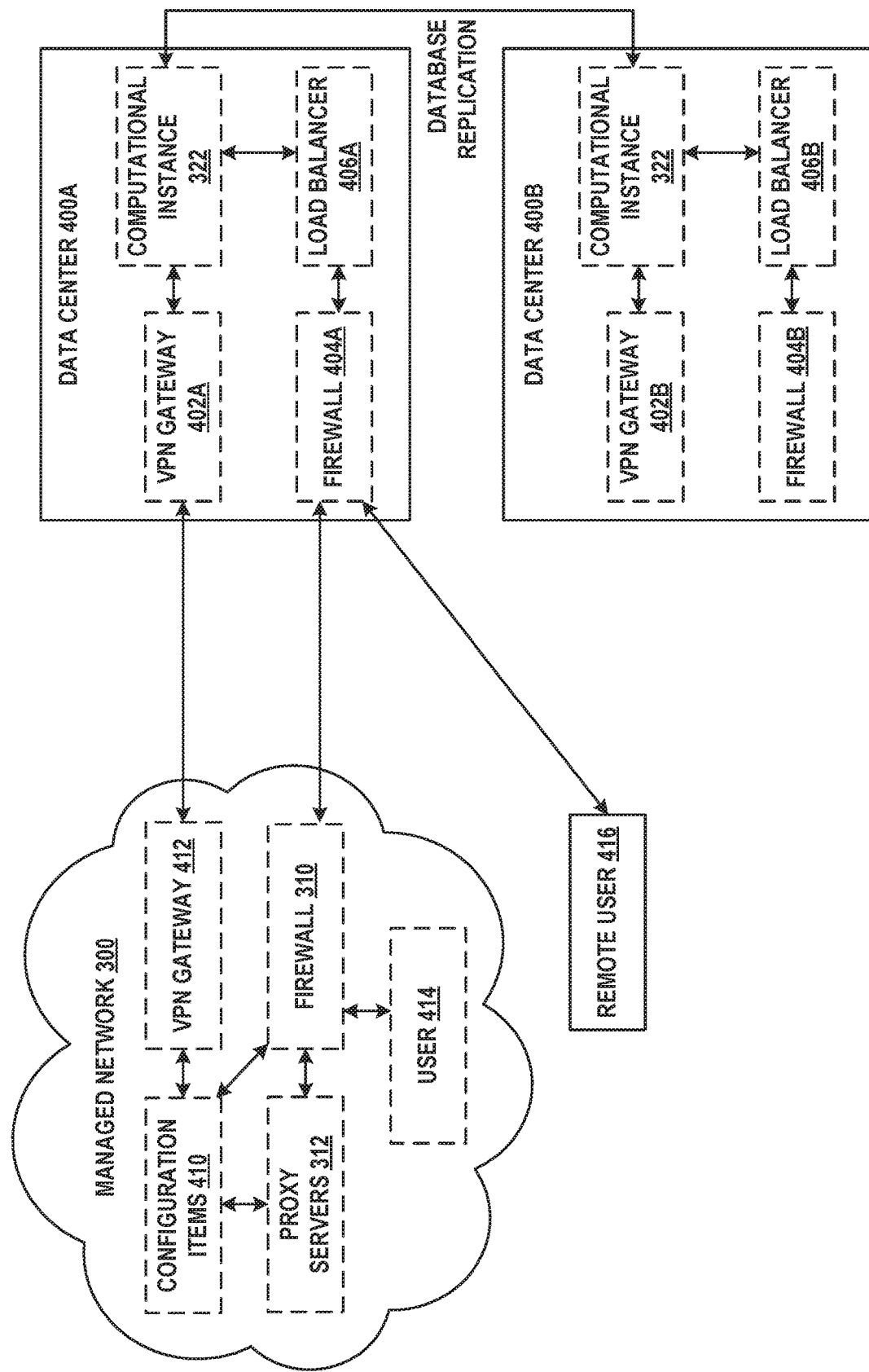
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a CMDB of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
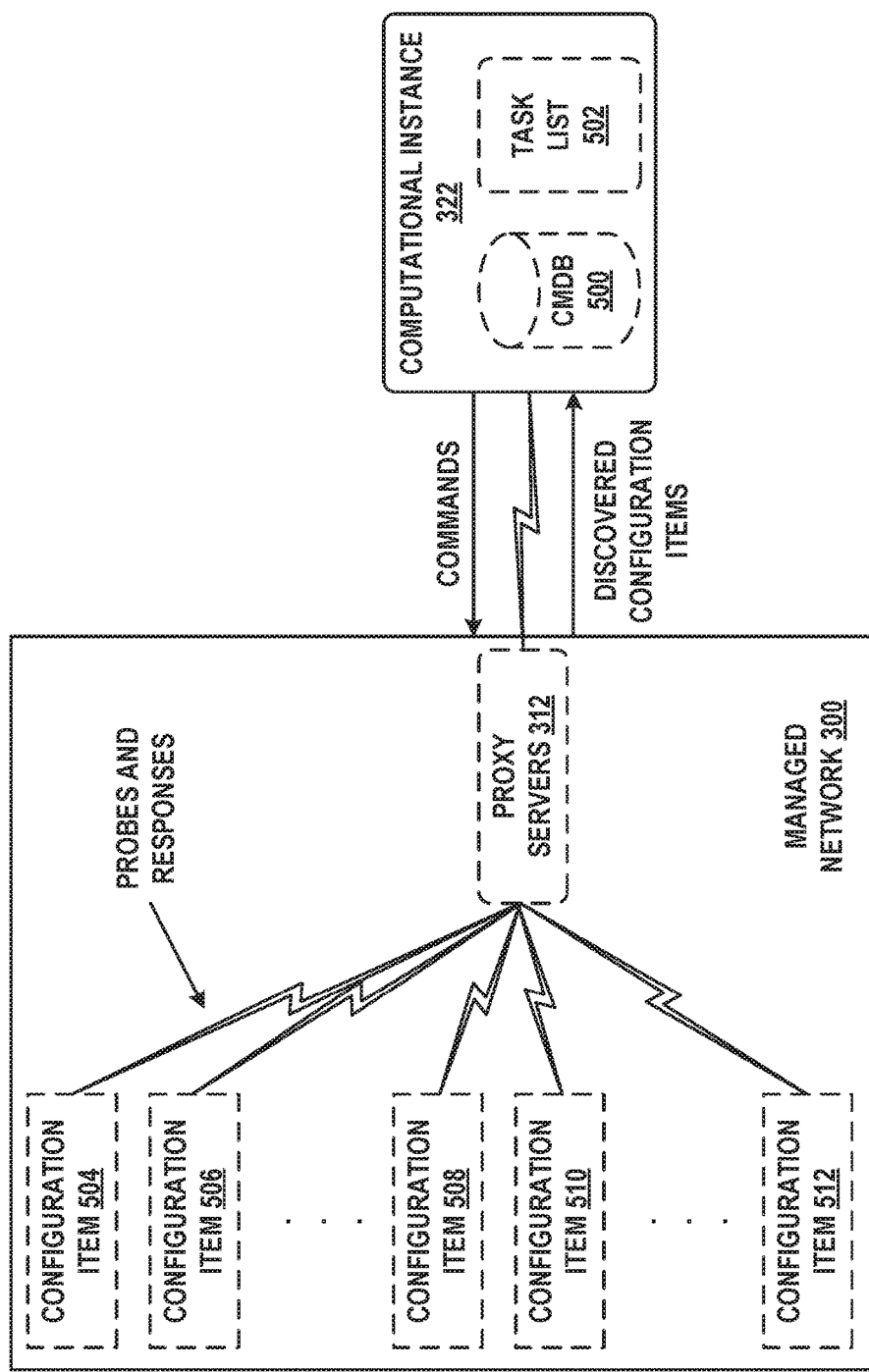
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
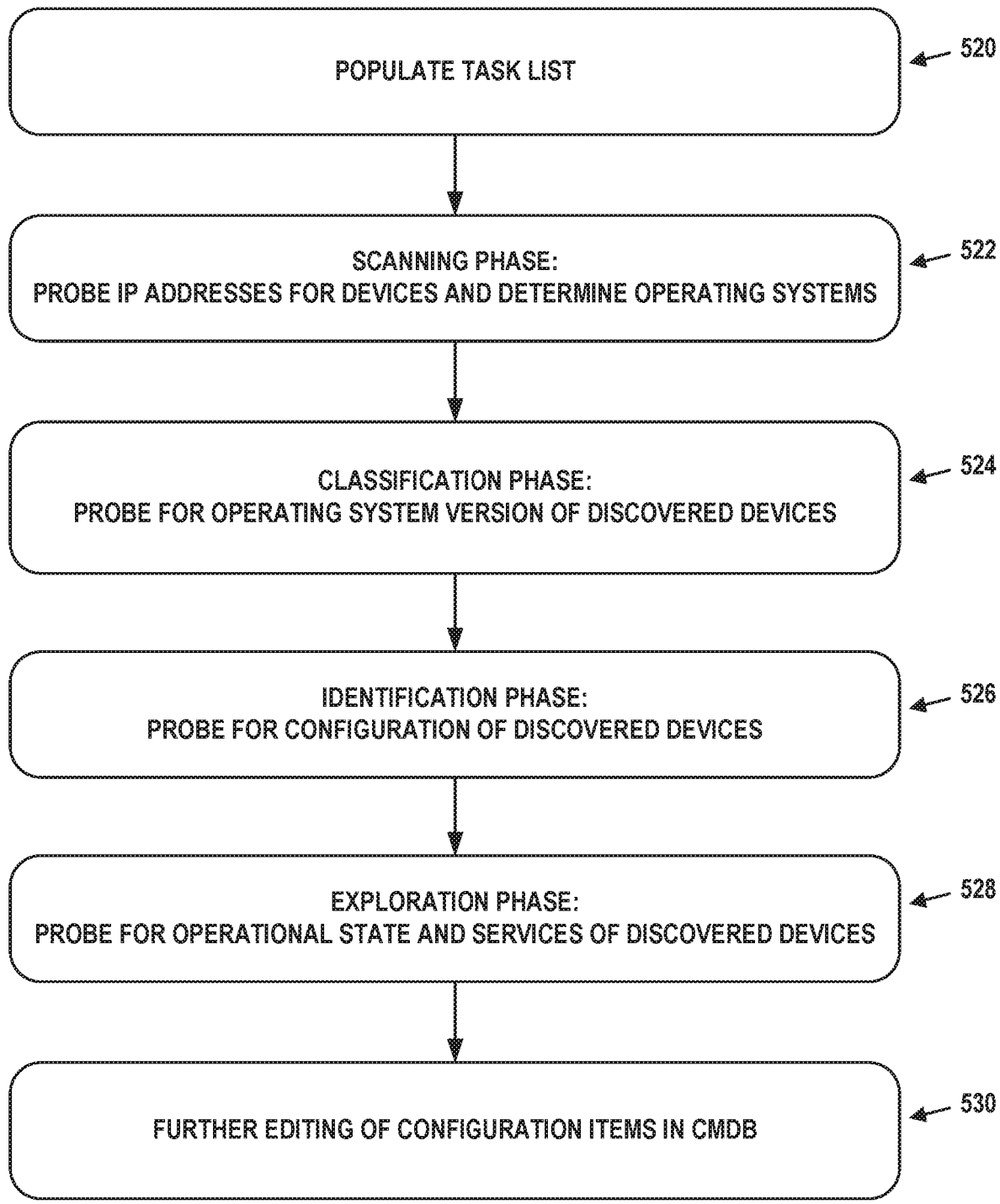
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Service Model

Figure 6:
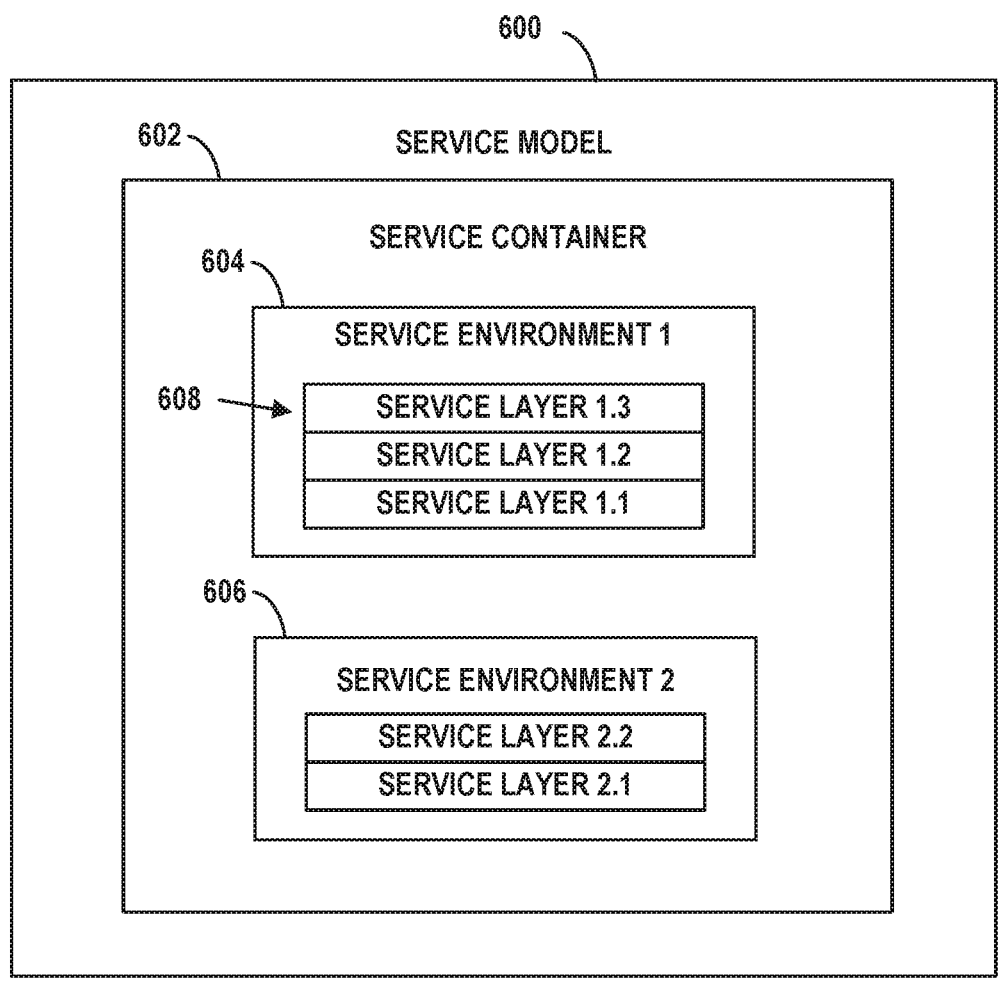
FIG. 6 is a schematic drawing of a structure of a service model, in accordance with example embodiments.

In line with the discussion above, a computational instance, such as computational instance 322, can store a database that contains a definition of a service model. By way of example, FIG. 6 is a schematic drawing illustrating an example structure of a service model 600. Service model 600 can represent CIs disposed within a managed network, such as a set of computing devices of a managed network and a set of software applications configured to execute on the set of computing devices. In addition, service model 600 may be used to model relationships and connections between CIs as reflected in CMDB 500.

As shown in FIG. 6, service model 600 includes one or more service containers 602 that contain information about various service environments 604 and 606. These environments 604 and 606 enable separating a service into various environments (e.g., development, production, testing, etc.). For example, service environment 604 may correspond to a first environment having first computing resources, and service environment 606 may correspond to a second environment having second computing resources.

Each of service environments 604 and 606 may include one or more service layers 608. Service layers 608 may include information and/or actions for the service corresponding to service container 602. For example, service layers 608 may include an entry points layer that contains data specifying the entry points for the service. Service layers 608 may also include a matching layer that contains data related to a topology for CIs associated with the service. Further, service layers 608 may include an impact layer that stores data related to event management operations, such as impact rules that are assigned to CIs associated with the service. Impact rules, which can be used for impact calculation, estimate the magnitude or severity of an outage based on one or more affected CIs. For example, an impact rule can define how impact applies to parent or child entities that are part of a business service, or how cluster members affect an overall cluster status based on a percentage or number of cluster members.

In some embodiments, service layers 608 may be arranged hierarchically and have dependencies between one another. For instance, each individual service layer may depend on the service layer(s) below the individual service layer. As one example, service layer 1.3 may depend on service layer 1.2, which in turn may depend on service layer 1.1. CIs of an environment can be assigned to one of service layers 608.

The topology of a service model can include a graph or service map that represents relationships between CIs associated with a service. For instance, the topology may be a visual representation that depicts particular applications operating on particular computing devices in the managed network as nodes in a graph. The edges of the graph may represent physical and/or logical network connectivity between these nodes. This visual representation allows users to rapidly determine the impact of a problematic CI on the rest of the service. For instance, rather than viewing, in isolation, the properties of a database application, this application can be represented as having connections to other applications and the computing devices that rely upon or support the application. Thus, if the database is exhibiting a problem (e.g., running out of storage capacity), the impacted service(s) can be efficiently determined.

Figure 7:
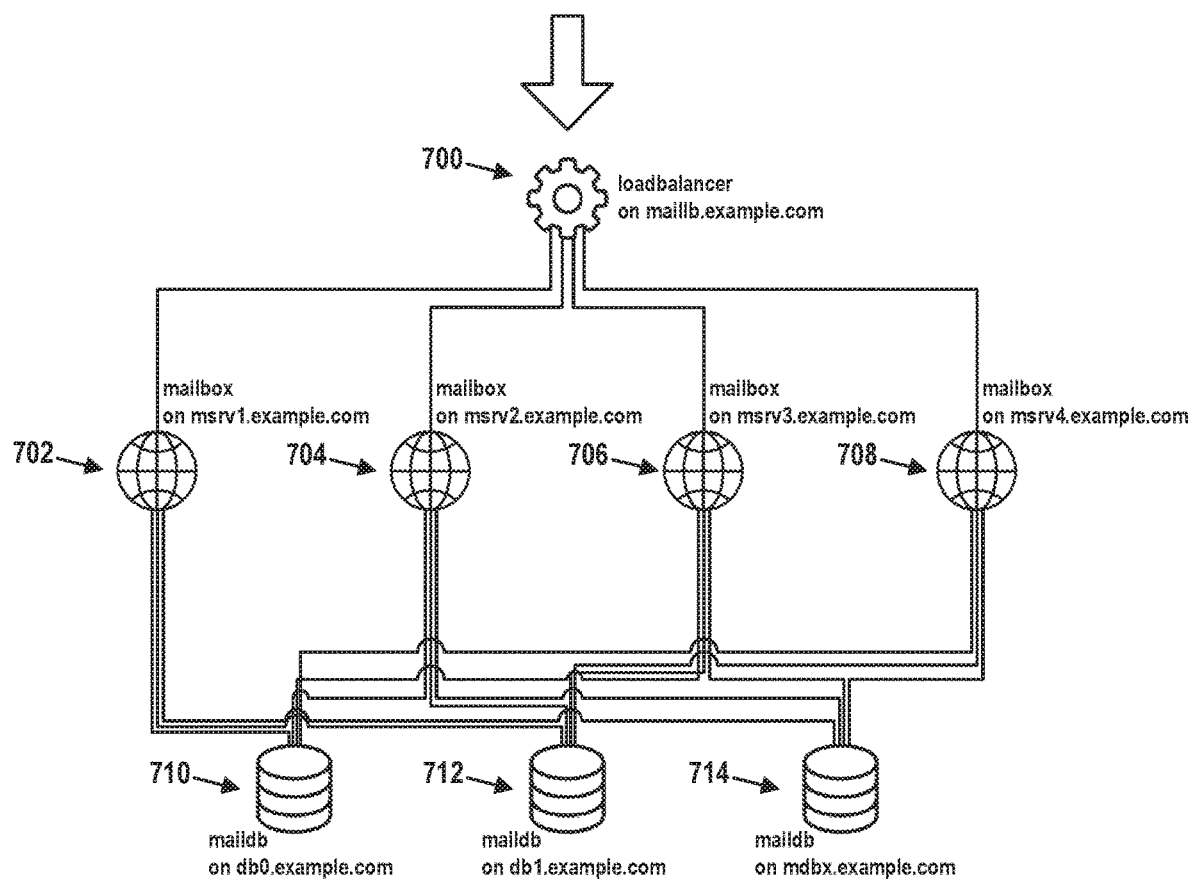
FIG. 7 depicts a service map representing computing devices and applications, in accordance with example embodiments.

FIG. 7 provides an example service map including applications and computing devices that make up an email service that supports redundancy and high-availability. This service map may be generated for display on the screen of a computing device. As noted above, the nodes in the service map represent applications operating on computing devices. These nodes may take the form of icons related to the respective functions of the applications or computing devices.

The entry point to the email service, as designated by the large downward-pointing arrow, may be load balancer 700. Load balancer 700 may be represented with a gear icon, and may operate on a device with host name maillb.example.com. This host name, as well as other host names herein, may be a partially-qualified or fully-qualified domain name in accordance with DNS domain syntax.

Load balancer 700 may distribute incoming requests across mailbox applications 702, 704, 706, and 708 operating on mail server devices msrv1.example.com, msrv2.example.com, msrv3.example.com, and msrv4.example.com, respectively. These mail server devices may be represented by globe icons on the service map. Connectivity between load balancer 700 and each of mailbox applications 702, 704, 706, and 708 is represented by respective edges.

Mailbox applications 702, 704, 706, and 708 may, for instance, respond to incoming requests for the contents of a user's mail folder, for the content of an individual email message, to move an email message from one folder to another, or to delete an email message. Mailbox applications 702, 704, 706, and 708 may also receive and process incoming emails for storage by the email service. Other email operations may be supported by mailbox applications 702, 704, 706, and 708. For sake of example, it may be assumed that mailbox applications 702, 704, 706, and 708 perform essentially identical operations, and any one of these applications may be used to respond to any particular request.

The actual contents of users' email accounts, including email messages, folder arrangements, and other settings, may be stored in one or more of mail database applications 710, 712, and 714. These applications may operate on database server devices db0.example.com, db1.example.com, and mdbx.example.com, which are represented by database icons on the network map. Connectivity between mailbox applications 702, 704, 706, and 708 and each of mail database applications 710, 712, and 714 also is represented by respective edges.

Mailbox applications 702, 704, 706, and 708 may retrieve requested data from mail database applications 710, 712, and 714, and may also write data to mail database applications 710, 712, and 714. The data stored by mail database applications 710, 712, and 714 may be replicated across all of the database server devices.

The arrangement of FIG. 7 may vary. For example, more or fewer load balancers, mailbox applications, mail database applications, as well as their associated devices, may be present. Furthermore, additional devices may be included, such as storage devices, routers, switches, and so on. Additionally, while FIG. 7 is focused on an example email service, similar network maps may be generated and displayed for other types of services, such as web services, remote access services, automatic backup services, content delivery services, and so on.

Additionally, nodes representing devices of the same type or operating the same application or type of application may be placed at the same horizontal level, as in FIG. 7. Nodes representing the entry point of the represented service may be placed at the top of the map, and the vertical arrangement of nodes may roughly correspond to the order in which the nodes become involved in carrying out operations of the service. Nonetheless, as the number of nodes and connections grows, such arrangements may vary for purposes of making presentation of the network map readable.

VII. Example Service Model Re-Computation

Synchronization between a CMDB, such as CMDB 500, and a service model, such as service model 600, can be maintained using a re-computation process. For instance, following a change in the CMDB, the re-computation process can be used to recalculate the structure or properties of the service model.

The change in the CMDB may include either a change to a CI attribute or a change to the topology of the service model (e.g., relations removed, relations added, etc.). For a change affecting a given CI, the re-computation process can involve updating the information for the given CI in the service model, and also re-building the topology of the service model based on relations between the given CI and other CIs of the CMDB. Re-building the topology can involve identifying an entry point of a service to which the given CI relates, tracing the entry point to the given CI based on a set of relations between the given CI and the entry point, and resolving the set of relations into a graph.

Unfortunately, however, this re-computation process can be wasteful in terms of consumption of memory and processing resources. For instance, for a CI change that does not affect a topology of the service model, recalculating the structure of the service model may be unnecessary. To address this and potentially other issues, multiple re-computation modes are provided, from which an appropriate re-computation mode can be selected and carried out based on a type of change that is made to a CI.

By way of example, when a change is made to a CI record of a CMDB, a server device can add a change record corresponding to the change to a change record table. The change record can specify a change type that is indicative of whether the change affects a topology of service model. The server device can use the change type specified in the change record as a basis for selecting a service model re-computation mode from among a plurality of service model re-computation modes, and re-compute a service layer of the service model in accordance with the selected service model re-computation mode.

For instance, if a CI change does not affect a topology of the service model, then, based on the CI change not affecting the topology, a fast re-computation mode can be selected rather than a full re-computation mode. In accordance with the fast re-computation mode, a CI record as changed can be merged into the definition of the service model without traversing the database in search of changes to the topology of the service model. On other hand, for a CI change that does affect a topology of the service model, the full re-computation mode can be selected.

In one example, when a full re-computation mode is selected, re-computing the service model can involve traversing the database based on entry points of the service so as to re-map the topology of a service layer. For instance, the entry points of the service can be provided as input to a topology builder. A CMDB walker of the topology builder can use the entry points as a starting point, and then "walk" through CI records of the CMDB based on configuration data for the entry points that specifies relations between the entry points and other CIs of the service environment. As the CDMB walker traverses the CMDB, the topology builder can discover the CIs that the entry points are related to, discover other CIs in the environment that those CIs are related to, and so forth. After walking through CI records of the CMDB for CIs of the service environment, the topology builder can then resolve the entry points, CIs, and relations into a graph of CIs, with the graph indicating relationships between the CIs. The resulting graph, and its CIs and relations, can then be incorporated into the service model.

FIG. 8 depicts an example change record table 800. As noted above, a server device can add change records to change record table 800 when changes are made to CI records of a CMDB. As shown in FIG. 8, each change record can specify a change type, service layer, service environment, CI identifier (ID), and status.

The change type can be indicative of whether the change affects a topology of the service model. In one example, the change type can be selected from one of four possible change types: topology change, CI change, impact rule change, and special CI change. The change type of topology change can be used for changes that affect the topology of the service model. For instance, topology change can be used for changes where a relation between a first CI and a second CI is added, removed, or modified.

The change types of CI change, impact rule change, and special CI change can be used for changes that do not affect a topology of the service model. For changes that do not affect the topology but do modify an impact rule assigned to a CI, the change type of impact rule change can be used. For changes that do not affect the topology but do modify one or more particular fields of a CI record (e.g., a name field), the change type of special CI change can be used. For changes that do not affect the topology, do not modify impact rules, and do not modify one or more of the particular fields, the change type of CI change can be used.

The service layer and service environment of a change record can reference a respective service layer and service environment that a CI is assigned to, while the CI ID can be an identifier of the CI.

Further, the status field of a change record can be used by a server device to manage re-computation of the service model. For example, the server device can re-compute service environments of the service model one-by-one. When the server device determines that change record table 800 includes at least one change record corresponding to a service environment, the server device can flag the service environment for re-computation. Further, the server device can then search through change record table for any service layers in that service environment having a status of "WAITING" and change the status to "IN_PROCESS." After a service layer is re-computed in accordance with the selected service model re-computation mode, the server device can change the status field for the service layer in change record table 800 to "PROCESSED".

When the server device re-computes a service environment, the server device can re-compute the service layers of the service environment one-by-one based on the change types of the service layers. By way of example, for each service layer, a service model re-computation mode can be selected based on the change type(s) for the change records corresponding to the service layer. For instance, for a service layer having a change record with change type of topology change, the server device can select a full re-computation mode for the service layer. When multiple change records having different change types correspond to a single service layer, the re-computation mode for the service layer can be determined based on the different change types.

Figure 9:
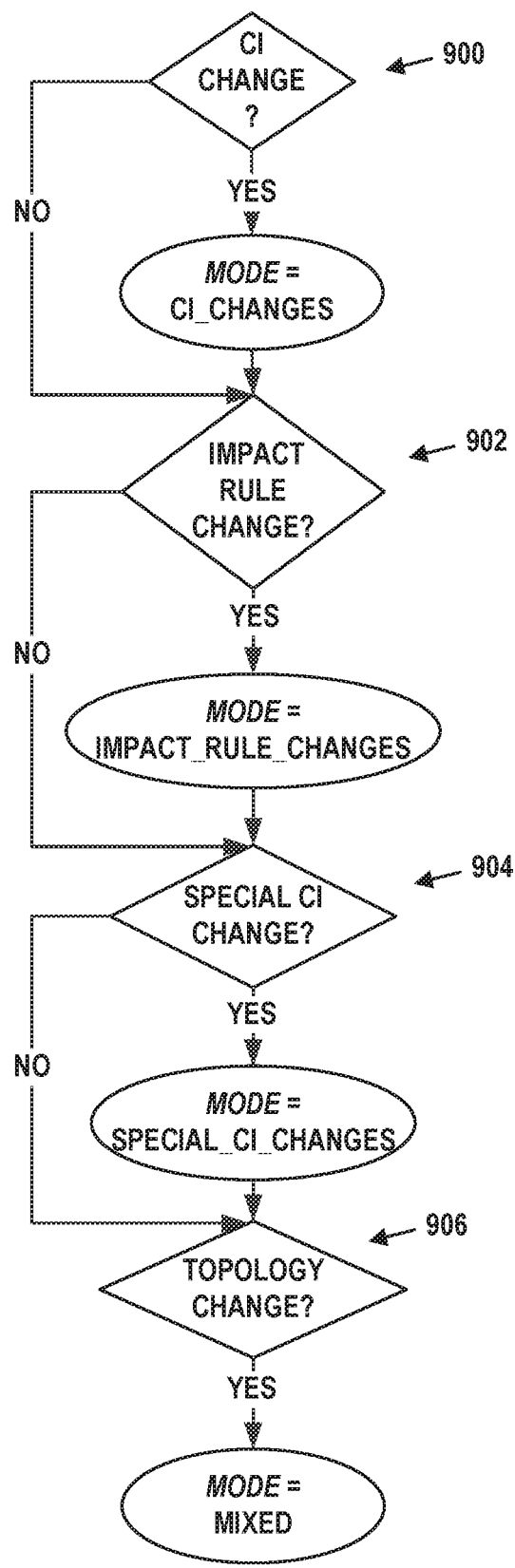
FIG. 9 is a flow chart, in accordance with example embodiments.

FIG. 9 is a flow chart depicting example operations that can be carried out to select a service model re-computation mode for a service layer. As shown in FIG. 9, at block 900, a server device can determine, with reference to a change record table, whether the service layer includes any change records having a type of CI change. Based on identifying at least one change record for the service layer having a change type of CI change, the server device can designate the service model re-computation mode as CI_CHANGES. This designation may be subsequently overridden, depending on the outcome of operations performed at blocks 902, 904, and 906.

At block 902, the server device can then further determine whether the service layer includes any change records having a change type of impact rule change. Based on identifying at least one change record for the service layer having a change type of impact rule change, the server device can designate the service model re-computation mode as IMPACT_RULE_CHANGES. This designation may be subsequently overridden, depending on the outcome of operations performed at blocks 904 and 906.

At block 904, the server device can then further determine whether the service layer includes any change records having a change type of special CI change. Based on identifying at least one change record for the service layer having a change type of special CI changes, the server device can designate the service model re-computation mode as SPECIAL_CI_CHANGES. This designation may also be subsequently overridden, depending on the outcome of the operation performed at block 906.

At block 906, the server device can then determine whether the service layer includes any change records having a change type of topology change. Based on identifying at least one change record for the service layer having a change type of topology change, the server device can designate the service model re-computation mode as MIXED. Therefore, the service model re-computation mode that is selected for the service layer is the mode designated after the operations at blocks 900, 902, 904, and 906 have been carried out.

The CI_CHANGES mode, the IMPACT_RULE_CHANGES mode, and the SPECIAL_CI_CHANGES mode can be fast re-computation modes. As noted above, as part of a fast-recomputation mode, a CI record as changed can be merged into the definition of the service model without traversing a CMDB in search of changes to the topology of the service model. The operations carried out in accordance with these three fast re-computation modes may, however, vary based on whether the mode is CI_CHANGES, IMPACT_RULE_CHANGES, or SPECIAL_CI_CHANGES. For instance, re-computing the service layer in accordance with the IMPACT_RULE_CHANGES mode can include providing an impact-rule-change notification to an event management service. As another example, re-computing the service layer in accordance with the SPECIAL_CI_CHANGES mode can include providing a name-change notification to the event management service.

The MIXED mode can be a full re-computation mode. Hence, re-computing the service layer in accordance with the MIXED mode can include traversing a CMDB based on entry points of a service so as to re-map the topology of the service layer.

In some examples, the server device can select a service model re-computation mode for a service layer of a service environment based on the service model re-computation mode that is selected for a previous layer of the service environment. For instance, with reference to service environment 604 of FIG. 6, the server device can select a service model re-computation layer for service layer 1.2 based on the service model re-computation mode that is selected for service layer 1.1. Similarly, the server device can select a service model re-computation layer for service layer 1.3 based on the service model re-computation mode that is selected for service layer 1.2.

In some cases, it may be desirable to select the service model re-computation mode for a service layer based on the service model re-computation mode of a previous layer. For instance, a full re-computation mode may have been selected for a previous service layer due to the presence of a topology change for a CI of the previous service layer. Since the topology change could affect other service layers, selecting the full re-computation mode for other service layers of the service environment can help to make sure the service model is updated to account for any topology changes within the service environment.

Figure 10:
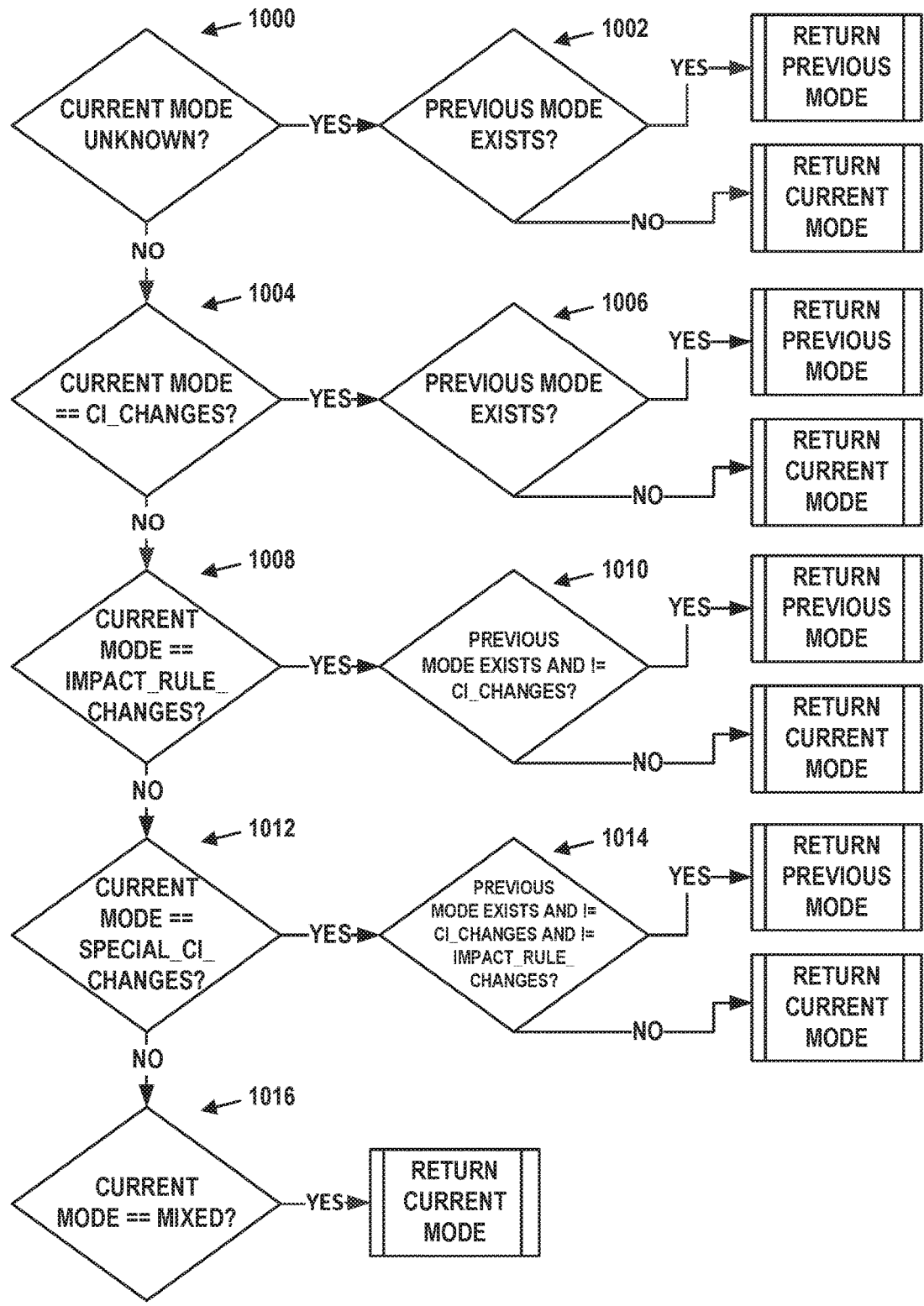
FIG. 10 is another flow chart, in accordance with example embodiments.

FIG. 10 is a flow chart depicting example operations that can be carried out to select a service model re-computation mode for a service layer based on the service model re-computation mode selected for a previous service layer. Within FIG. 10, current mode refers to the current service model re-computation mode that is selected for a service layer based on change types of change records for the service layer. Further, previous mode refers to the service model re-computation mode that is selected for the previous service layer (e.g., a service layer that is immediately below the service layer hierarchically). The operations of FIG. 10 could be carried out as part of a process that receives as input a current mode for a service layer and a previous mode for the previous service layer and outputs (i.e., returns) either the current mode or the previous mode as a service model re-computation mode for the service layer.

As shown in FIG. 10, at block 1000, the server device determines whether the current mode is UNKNOWN. The current mode could, for instance, be unknown if there are not any change records corresponding to the service layer in the change record table. In some instances, when the server device re-computes a service environment, the server device may re-compute all service layers of that service environment. Hence, it is possible that the change record table might not include any change records corresponding to the service layer in which case the current mode would be UNKNOWN. Based on determining that the current mode is UKNOWN, the server device can then, at block 1002, determine whether the previous mode exists. If the previous mode exists, the previous mode is returned. Whereas, if the previous mode does not exist, the current mode (i.e., UNKNOWN) is returned. The UKNOWN mode is a full re-computation mode.

Based on determining that the current mode is not UNKNOWN, at block 1004, the server device determines whether the current mode is CI_CHANGES. Based on determining that the current mode is CI_CHANGES, the server device can then, at block 1006, determine whether the previous mode exists. If the previous mode exists, the previous mode is returned. Whereas, if the previous mode does not exist, the current mode (i.e., CI_CHANGES) is returned.

Based on determining that the current mode is not CI_CHANGES, at block 1008, the server device determines whether the current mode is IMPACT_RULE_CHANGES. Based on determining that the current mode is IMPACT_RULE_CHANGES, the server device can then, at block 1010, determine whether the previous mode exists and is not equal to CI_CHANGES. If the previous mode exists and is not equal to CI_CHANGES, the previous mode is returned. Whereas, if the previous mode does not exist or is equal to CI_CHANGES, the current mode (i.e., IMPACT_RULE_CHANGES) is returned. In other words, based on the determination at block 1010, the returned mode is either IMPACT_RULE_CHANGES, SPECIAL_CI_CHANGES, or MIXED. This can ensure that, if the previous service layer or the current service layer includes a special CI change or a topology change, the re-computation mode for the service layer will be determined based on the previous mode, so that the service layer can be re-computed as appropriate to account for the special CI change or the topology change.

Based on determining that the current mode is not IMPACT_RULES_CHANGES, at block 1012, the server device determines whether the current mode is SPECIAL_CI_CHANGES. Based on determining that the current mode is SPECIAL_CI_CHANGES, the server device can then, at block 1014, determine whether the previous mode exists and is not equal to CI_CHANGES and is also not equal to IMPACT_RULE_CHANGES. If the previous mode exists and is not equal to CI_CHANGES and is also not equal to IMPACT_RULE_CHANGES, the previous mode is returned. Whereas, if the previous mode does not exist or is equal to CI_CHANGES or is equal to IMPACT_RULE_CHANGES, the current mode (i.e., SPECIAL_CI_CHANGES) is returned.

Based on determining that the current mode is not SPECIAL_CI_CHANGES, at block 1016, the server device determines whether the current mode is MIXED. Based on determining that the current mode is MIXED, the current mode is returned. As noted above, the MIXED mode is a full re-computation mode.

VIII. Example Operations

Figure 11:
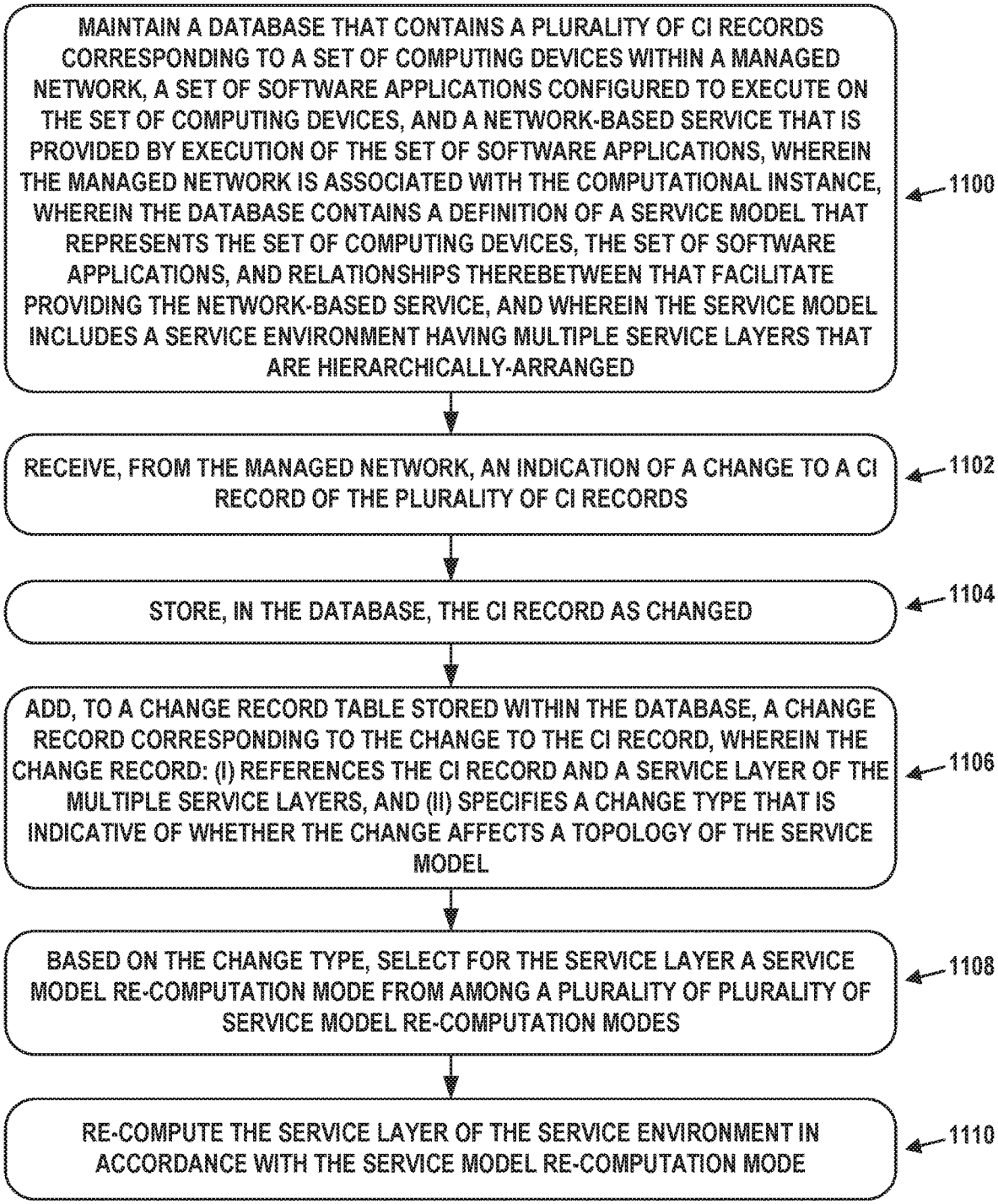
FIG. 11 is another flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 of FIG. 11 may involve maintaining, by one or more computing devices of a computational instance, a database that contains a plurality of CI records corresponding to a set of computing devices within a managed network, a set of software applications configured to execute on the set of computing devices, and a network-based service that is provided by execution of the set of software applications. The managed network may be associated with the computational instance. In addition, the database may contains a definition of a service model that represents the set of computing devices, the set of software applications, and relationships therebetween that facilitate providing the network-based service. Further, the service model may include a service environment having multiple service layers that are hierarchically-arranged.

Block 1102 of FIG. 11 may involve receiving, by the one or more computing devices from the managed network, an indication of a change to a CI record of the plurality of CI records.

Block 1104 of FIG. 11 may involve storing, in the database, the CI record as changed.

Block 1106 of FIG. 11 may involve adding, by the one or more computing devices to a change record table stored within the database, a change record corresponding to the change to the CI record. The change record may (i) reference the CI record and a service layer of the multiple service layers, and (ii) specify a change type that is indicative of whether the change affects a topology of the service model.

Block 1108 of FIG. 11 may involve selecting, by the one or more computing devices based on the change type, for the service layer a service model re-computation mode from among a plurality of service model re-computation modes.

Block 1110 of FIG. 11 may involve re-computing, by the one or more computing devices, the service layer of the service environment in accordance with the service model re-computation mode.

In some cases, the change type indicates that the change does not affect the topology, and selecting the service model re-computation model may involve selecting a fast re-computation mode rather than a full re-computation mode that consumes more memory when carried out than the fast re-computation mode. In these embodiments, re-computing the service layer of the service environment in accordance with the fast re-computation mode may involve merging the CI record as changed into the service model without traversing the database in search of changes to the topology of the service model.

Additionally, the change type may further indicate that the change is an impact rule change, in which case re-computing the service layer of the service environment in accordance with the fast re-computation mode may further involve providing an impact-rule-change notification to an event management service disposed within the remote network management platform. Alternatively, the change type may further indicate that the change is a change to a name field of the CI record, in which re-computing the service layer of the service environment in accordance with the fast re-computation mode may further involve providing a name-change notification to an event management service disposed within the remote network management platform.

In some cases, the change type indicates that the change affects the topology, and selecting the service model re-computation mode involves selecting a full re-computation mode rather than a fast re-computation mode that consumes less memory when carried out than the full re-computation mode. In these embodiments, re-computing the service layer of the service environment in accordance with the full re-computation mode may involve traversing the database based on entry points of the network-based service so as to re-map the topology of the service layer. These embodiments of FIG. 11 may further involve (i) receiving, from the managed network, an indication of a second change to a second CI record of the plurality of CI records; (ii) adding, to the change record table, a second change record corresponding to the second change to the second CI record, wherein the second change record references the second CI record and a second service layer within the service environment and specifies a second change type that is indicative of whether the second change affects the topology; (iii) selecting for the second service layer, based on the change type and the second change type, a second service model re-computation mode from among the plurality of service model re-computation modes; and (iv) re-computing the second service layer of the service environment in accordance with the second service model re-computation mode. In these embodiments, the second change type may indicate that the second change does not affect the topology, but selecting the second service model re-computation mode may involve selecting the full re-computation mode based on the service model re-computation mode for the service layer being the full re-computation mode even though the second change does not affect the topology.

Some of the embodiments of FIG. 11 may further involve flagging the service environment for re-computation based on a reference to the service layer within the service environment. Additionally or alternatively, in some of the embodiments of FIG. 11, re-computing the service layer of the service environment in accordance with the service model re-computation mode may involve creating a snapshot of the network-based service. The snapshot may specify a time indicative of when the re-computing is completed.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computational instance of a remote network management platform comprising:
a database that contains a plurality of configuration item (CI) records corresponding to a set of computing devices disposed within a managed network, a set of software applications configured to execute on the set of computing devices, and a network-based service that is provided by execution of the set of software applications, wherein the managed network is associated with the computational instance, wherein the database contains a definition of a service model that represents the set of computing devices, the set of software applications, and relationships therebetween that facilitate providing the network-based service, and wherein the service model includes a service environment having multiple service layers that are hierarchically-arranged within the service environment; and
one or more server devices configured to:
receive, from the managed network, an indication of a change to a CI record of the plurality of CI records;
store, in the database, the CI record as changed;
add, to a change record table stored within the database, a change record corresponding to the change to the CI record, wherein the change record: (i) references the CI record and a service layer of the multiple service layers, and (ii) specifies a change type that is indicative of whether the change affects a topology of the service model;
based on the change type, select for the service layer a service model re-computation mode from among a plurality of service model re-computation modes, wherein selecting the service model re-computation mode comprises:
in response to the change type indicating that the change does not affect the topology of the service model, selecting a fast re-computation mode; and
in response to the change type indicating that the change does affect the topology of the service model, selecting a full re-computation mode; and
re-compute the service layer of the service environment in accordance with the selected service model re-computation mode.

2. The computational instance of claim 1, wherein the full re-computation mode consumes more memory when carried out than the fast re-computation mode.

3. The computational instance of claim 2, wherein re-computing the service layer of the service environment in accordance with the fast re-computation mode comprises merging the CI record as changed into the service model without traversing the database in search of changes to the topology of the service model.

4. The computational instance of claim 3, wherein the change type indicates that the change is an impact rule change, and wherein re-computing the service layer of the service environment in accordance with the fast re-computation mode comprises providing an impact-rule-change notification to an event management service disposed within the remote network management platform.

5. The computational instance of claim 3, wherein the change type indicates that the change is a change to a name field of the CI record, and wherein re-computing the service layer of the service environment in accordance with the fast re-computation mode comprises providing a name-change notification to an event management service disposed within the remote network management platform.

6. The computational instance of claim 1, wherein the change type indicates that the change affects the topology, wherein selecting the service model re-computation mode comprises selecting the full re-computation mode rather than the fast re-computation mode that consumes less memory when carried out than the full re-computation mode.

7. The computational instance of claim 6, wherein re-computing the service layer of the service environment in accordance with the full re-computation mode comprises traversing the database based on entry points of the network-based service so as to re-map the topology of the service layer.

8. The computational instance of claim 6, wherein the one or more server devices are configured to:
receive, from the managed network, an indication of a second change to a second CI record of the plurality of CI records;
add, to the change record table, a second change record corresponding to the second change to the second CI record, wherein the second change record: references the second CI record and a second service layer of within the service environment, and specifies a second change type that is indicative of whether the second change affects the topology;
selecting for the second service layer, based on the change type and the second change type, a second service model re-computation mode from among the plurality of service model re-computation modes; and
re-computing the second service layer of the service environment in accordance with the selected second service model re-computation mode.

9. The computational instance of claim 8, wherein the second change type indicates that the second change does not affect the topology, and wherein selecting the second service model re-computation mode comprises selecting the full re-computation mode based on the service model re-computation mode for the service layer being the full re-computation mode even though the second change does not affect the topology.

10. The computational instance of claim 1, wherein the one or more server devices are configured to flag the service environment for re-computation based on a reference to the service layer within the service environment.

11. The computational instance of claim 1, wherein re-computing the service layer of the service environment in accordance with the service model re-computation mode comprises creating a snapshot of the network-based service, wherein the snapshot specifies a time indicative of when the re-computing is completed.

12. A method comprising:
maintaining, by one or more server devices of a computational instance, a database that contains a plurality of configuration item (CI) records corresponding to a set of computing devices within a managed network, a set of software applications configured to execute on the set of computing devices, and a network-based service that is provided by execution of the set of software applications, wherein the managed network is associated with the computational instance, wherein the database contains a definition of a service model that represents the set of computing devices, the set of software applications, and relationships therebetween that facilitate providing the network-based service, and wherein the service model includes a service environment having multiple service layers that are hierarchically-arranged;
receiving, by the one or more server devices, from the managed network, an indication of a change to a CI record of the plurality of CI records;
storing, in the database, the CI record as changed;
adding, by the one or more server devices, to a change record table stored within the database, a change record corresponding to the change to the CI record, wherein the change record: (i) references the CI record and a service layer of the multiple service layers, and (ii) specifies a change type that is indicative of whether the change affects a topology of the service model;
based on the change type, selecting, by the one or more server devices, for the service layer a service model re-computation mode from among a plurality of service model re-computation modes, wherein selecting the service model re-computation mode comprises:
in response to the change type indicating that the change does not affect the topology of the service model, selecting a fast re-computation mode; and
in response to the change type indicating that the change does affect the topology of the service model, selecting a full re-computation mode; and
re-computing, by the one or more server devices, the service layer of the service environment in accordance with the selected service model re-computation mode.

13. The method of claim 12, wherein selecting the full re-computation mode that consumes more memory when carried out than the fast re-computation mode.

14. The method of claim 13, wherein re-computing the service layer of the service environment in accordance with the fast re-computation mode comprises merging the CI record as changed into the service model without traversing the database in search of changes to the topology of the service model.

15. The method of claim 14, wherein the change type indicates that the change is an impact rule change, and wherein re-computing the service layer of the service environment in accordance with the fast re-computation mode comprises providing an impact-rule-change notification to an event management service.

16. The method of claim 14, wherein the change type indicates that the change is a change to a name field of the CI record, and wherein re-computing the service layer of the service environment in accordance with the fast re-computation mode comprises providing a name-change notification to an event management service.

17. The method of claim 12, wherein the change type indicates that the change affects the topology, wherein selecting the service model re-computation mode comprises selecting the full re-computation mode rather than the fast re-computation mode that consumes less memory when carried out than the full re-computation mode.

18. The method of claim 17, wherein re-computing the service layer of the service environment in accordance with the full re-computation mode comprises traversing the database based on entry points of the network-based service so as to re-map the topology of the service layer.

19. The method of claim 12, wherein re-computing the service layer of the service environment in accordance with the service model re-computation mode comprises creating a snapshot of the network-based service, wherein the snapshot specifies a time indicative of when the re-computing is completed.

20. An article of manufacture including a non-transitory computer-readable medium, having stored thereon program instructions that, upon execution by one or more server devices of a computational instance of a remote network management platform, cause the one or more server devices to perform operations comprising:

maintaining a database that contains a plurality of configuration item (CI) records corresponding to a set of computing devices within a managed network, a set of software applications configured to execute on the set of computing devices, and a network-based service that is provided by execution of the set of software applications, wherein the managed network is associated with the computational instance, wherein the database contains a definition of a service model that represents the set of computing devices, the set of software applications, and relationships therebetween that facilitate providing the network-based service, and wherein the service model includes a service environment having multiple service layers that are hierarchically-arranged;

receiving, from the managed network, an indication of a change to a CI record of the plurality of CI records;

storing, in the database, the CI record as changed;

adding, to a change record table stored within the database, a change record corresponding to the change to the CI record, wherein the change record: (i) references the CI record and a service layer of the multiple service layers, and (ii) specifies a change type that is indicative of whether the change affects a topology of the service model;

based on the change type, selecting for the service layer a service model re-computation mode from among a plurality of service model re-computation modes, wherein selecting the service model re-computation mode comprises:

in response to the change type indicating that the change does not affect the topology of the service model, selecting a fast re-computation mode; and in response to the change type indicating that the change does affect the topology of the service model, selecting a full re-computation mode; and re-computing the service layer of the service environment in accordance with the selected service model re-computation mode.

* * * * *